(12) United States Patent
Nishimura

(10) Patent No.: US 11,671,190 B2
(45) Date of Patent: Jun. 6, 2023

(54) TARGET LOCATION INFERENCE APPARATUS, TARGET LOCATION INFERENCE METHOD, TARGET INFORMATION PROVIDING APPARATUS, AND TARGET LOCATION INFERENCE SYSTEM

(71) Applicant: Murata Manufacturing Co., Ltd., Kyoto (JP)

(72) Inventor: Tetsu Nishimura, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 75 days.

(21) Appl. No.: 17/406,701

(22) Filed: Aug. 19, 2021

(65) Prior Publication Data

US 2022/0085898 A1     Mar. 17, 2022

(30) Foreign Application Priority Data

Sep. 17, 2020    (JP) .............................. JP2020-155959

(51) Int. Cl.
*H04B 17/318*     (2015.01)
*H04B 1/02*     (2006.01)
*H04B 1/06*     (2006.01)

(52) U.S. Cl.
CPC ............. *H04B 17/318* (2015.01); *H04B 1/02* (2013.01); *H04B 1/06* (2013.01)

(58) Field of Classification Search
CPC .......... H04B 17/318; H04B 1/02; H04B 1/06; H04B 17/27
See application file for complete search history.

(56) References Cited

U.S. PATENT DOCUMENTS

2015/0347351 A1* 12/2015 Kazemi ................. G01S 19/396
                                                   702/180
2019/0035244 A1* 1/2019 Garg .................. G08B 13/2491
2019/0306690 A1* 10/2019 HomChaudhuri .... H04W 8/005

FOREIGN PATENT DOCUMENTS

| JP | 2006-118882 A | | 5/2006 |
|----|---------------|---|--------|
| JP | 2017090284 A | * | 5/2017 |
| JP | 2019-002850 A | | 1/2019 |

OTHER PUBLICATIONS

Machine Translation for JP-2017090284-A (Year: 2023).*

* cited by examiner

*Primary Examiner* — Jean B Corrielus
(74) *Attorney, Agent, or Firm* — Pearne & Gordon LLP

(57) ABSTRACT

A target location inference apparatus includes a receiving section and an operation section. The receiving section receives a first radio signal from a first transmitter disposed on a target and a second radio signal from a second transmitter disposed in a reference location. The operation section infers a target presence range in which the target is present with respect to the reference location. The target presence range is inferred based on a first received radio signal strength, in the receiving section, of the first radio signal and a second received radio signal strength, in the receiving section, of the second radio signal.

11 Claims, 11 Drawing Sheets

FIG. 14

|  | TAG 81 | TAG 82 | TAG 83 | TAG 84 |
|---|---|---|---|---|
| TAG 91 | $L_{9181}(X1)$ | – | – | – |
| TAG 92 | $L_{9281}(X2)$ | $L_{9282}(X3)$ | – | – |
| TAG 93 | – | $L_{9382}(X1)$ | $L_{9383}(X2)$ | – |
| TAG 94 | – | – | – | $L_{9484}(X3)$ |

TARGET LOCATION INFERENCE APPARATUS, TARGET LOCATION INFERENCE METHOD, TARGET INFORMATION PROVIDING APPARATUS, AND TARGET LOCATION INFERENCE SYSTEM

CROSS REFERENCE TO RELATED APPLICATION

This application claims priority from Japanese Patent Application No. 2020-155959 filed on Sep. 17, 2020. The content of this application is incorporated herein by reference in its entirety.

BACKGROUND

The present disclosure relates to technology for inferring a range in which a target is present.

Japanese Unexamined Patent Application Publication No. 2006-118882 describes a position measurement apparatus. The position measurement apparatus includes transmitters and a receiver. Each transmitter transmits a signal including an identifier unique to the transmitter. The receiver receives respective signals from the transmitters.

The receiver discriminates a signal transmitted from the transmitter of a position measurement target from signals from the transmitters other than the position measurement target. The receiver calculates similarity between chronological variation in the signal from the transmitter of the position measurement target and chronological variation in each signal from the corresponding transmitter other than the position measurement target. Based on the similarity, the receiver measures the position of the position measurement target.

BRIEF SUMMARY

However, the strength of the signal from the transmitter easily varies depending on the reception environment or the like. It is thus difficult on occasions to infer the location of the position measurement target (target) by the method using the similarity.

The present disclosure more reliably infers a range in which a target is present.

According to embodiments of the present disclosure, a target location inference apparatus includes a receiving section and an operation section. The receiving section receives a first radio signal from a first transmitter disposed on a target and a second radio signal from a second transmitter disposed in a reference location and measures the strength of a received radio signal. The operation section infers a target presence range in which the target is present with respect to the reference location, based on a first received radio signal strength of the first radio signal and a second received radio signal strength of the second radio signal.

In this configuration, the first received radio signal strength and the second received radio signal strength are used to infer a distance between the first transmitter and the second transmitter (a distance from the reference location to the target). The first received radio signal strength depends on a first distance between the first transmitter and the receiving section, and the second received radio signal strength depends on a second distance between the second transmitter and the receiving section.

Based on the first received radio signal strength, the first distance is calculated within a predetermined accuracy range. Based on the second received radio signal strength, the second distance is calculated within the predetermined accuracy range. The distance between the first transmitter and the second transmitter (distance from the reference location to the target), the first distance, and the second distance have a predetermined geometric relationship. Calculating the first distance and the second distance within the predetermined accuracy ranges enables the distance between the first transmitter and the second transmitter (distance from the reference location to the target) to be inferred within a predetermined accuracy range.

The present disclosure enables the target presence range to be inferred more reliably.

Other features, elements, characteristics and advantages of the present disclosure will become more apparent from the following detailed description of embodiments of the present disclosure with reference to the attached drawings.

BRIEF DESCRIPTION OF THE SEVERAL VIEWS OF THE DRAWINGS

FIG. 14 is a table illustrating an example of information stored in an information providing server.

DETAILED DESCRIPTION

First Embodiment

Figure 1:
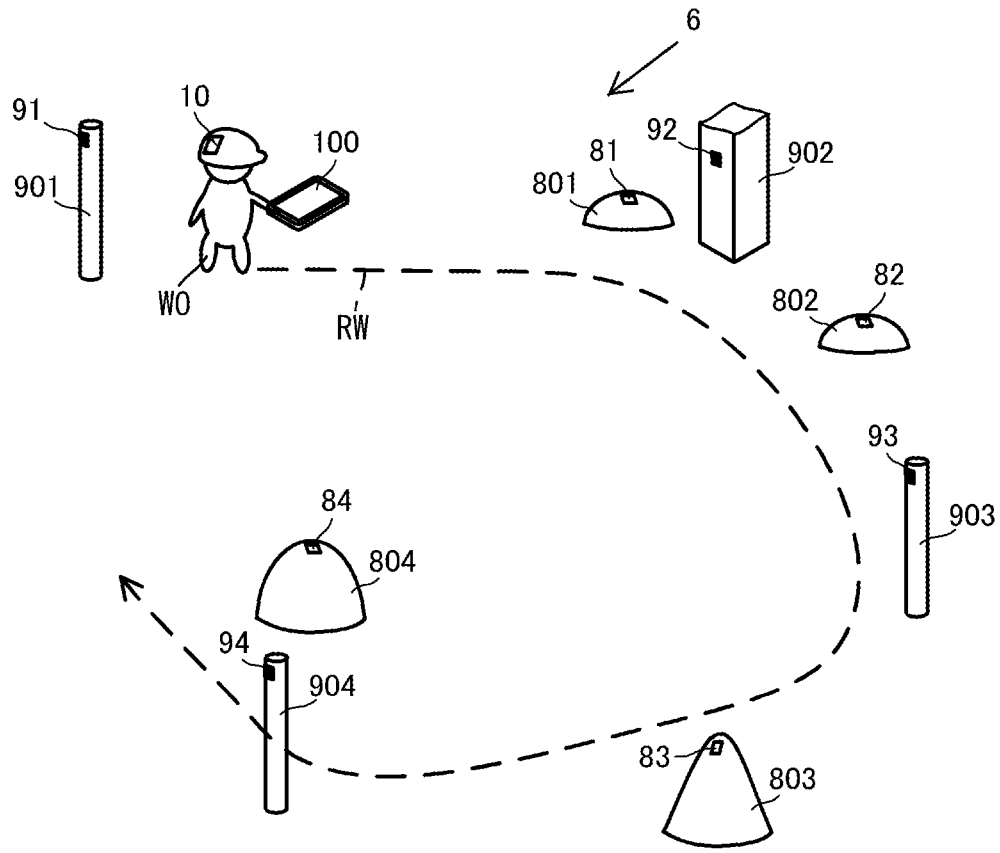
FIG. 1 is a view illustrating the usage of a target location inference apparatus according to an embodiment of the present disclosure.

Usage of Target Location Inference Apparatus and Target Location Inference System FIG. 1 is a view illustrating the usage of a target location inference apparatus according to an embodiment of the present disclosure. For example, as illustrated in FIG. 1, targets (targets 801, 802, 803, and 804 in FIG. 1) are disposed in unknown locations in a predetermined area 6, and a target location inference apparatus 10 is used when a person (a worker WO in FIG. 1) searches for an intended target. More specifically, for example, when the worker WO searches for a material (target) disposed by a different worker in the building site, the target location inference apparatus 10 is used. In such a situation, the material (target) is not necessarily disposed in a fixed location and thus is not easy to find. In a building in particular, it is difficult to use a positioning system, such as a global positioning system (GPS). Accordingly, it is not easy to update location information regarding the material (target), and the configuration and the process of the present disclosure are effective.

As illustrated in FIG. 1, the targets 801, 802, 803, and 804 are disposed in the area 6. The number of targets is not limited to the number in this example. A tag 81 is attached to the target 801; a tag 82, the target 802; a tag 83, the target 803; and a tag 84, the target 804.

The tags 81 to 84 are each an electronic tag, such as a radio frequency identification (RFID) tag and are able to transmit radio signals each including identification information (such as a unique ID) to the outside. The radio signals may be, for example, a beacon signal in a specific frequency band. The identification information of the tags 81 to 84 may include information regarding targets having the tags 81 to 84 attached thereto (information indicating whether the object is a target or a reference object, such as the type of a target). These tags 81 to 84 each correspond to a first transmitter of the present disclosure.

In the area 6, reference objects 901, 902, 903, and 904 are also disposed. The reference objects 901 to 904 are, for example, a post of a building, or a prop for working, disposed in fixed locations and visible by the worker WO. Note that the number of reference objects is not limited to this example, either. A tag 91 is attached to the reference object 901; a tag 92, the reference object 902; a tag 93, the reference object 903; and a tag 94, the reference object 904.

The tags 91 to 94 are each an electronic tag, such as a RFID tag and are able to transmit radio signals each including identification information (such as a unique ID) to the outside. Note that the identification information of the tags 91 to 94 may include information regarding reference objects having the tags 91 to 94 attached thereto (information indicating whether the object is a target or a reference object, such as the type of a reference object). These tags 91 to 94 correspond to a second transmitter of the present disclosure.

The worker WO wears the target location inference apparatus 10. In a more specific example, as illustrated in FIG. 1, the target location inference apparatus 10 is fixed on the helmet worn by the worker WO. The details of the configuration and the process thereby will be described later. The target location inference apparatus 10 generates inferred information regarding the location of the target in the following manner.

The target location inference apparatus 10 receives radio signals (first radio signals) transmitted from the tags 81 to 84. The target location inference apparatus 10 receives radio signals (second radio signals) transmitted from the tags 91 to 94. The target location inference apparatus 10 demodulates the first radio signals and the second radio signals and measures the received radio signal strength indicator (RSSI) of each signal.

The target location inference apparatus 10 calculates a distance between a tag attached to the target and the target location inference apparatus 10 (first transmitter-receiver distance) from the RSSI of the first radio signal. The target location inference apparatus 10 calculates a distance between a tag attached to the reference object and the target location inference apparatus 10 (second transmitter-receiver distance) from the RSSI of the second radio signal.

If the target location inference apparatus 10, the target, and the reference object are not arranged on a line, a straight line connecting the target and the reference object, a straight line connecting the target and the target location inference apparatus 10, and a straight line connecting the reference object and the target location inference apparatus 10 form a triangle (see FIGS. 4A, 4C, 9A, and 9C).

Figure 4A:
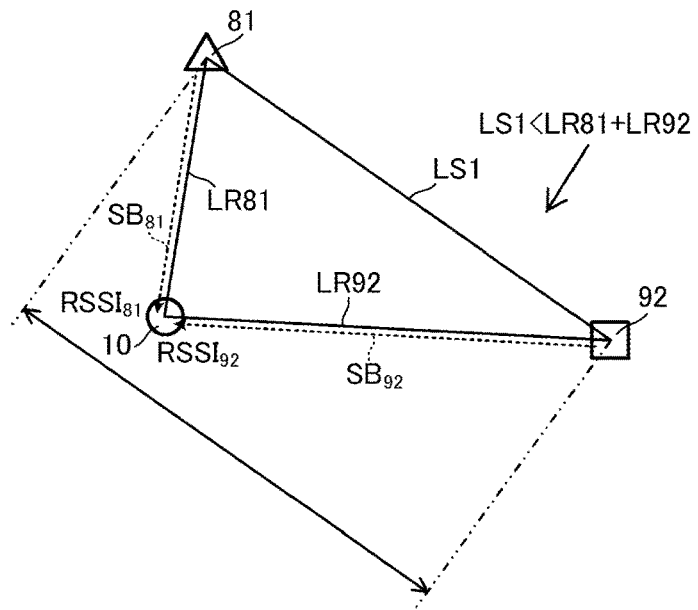
FIGS. 4A, 4B, and 4C are each a view for explaining an idea for calculating a tentative reference-target distance.
Figure 4B:
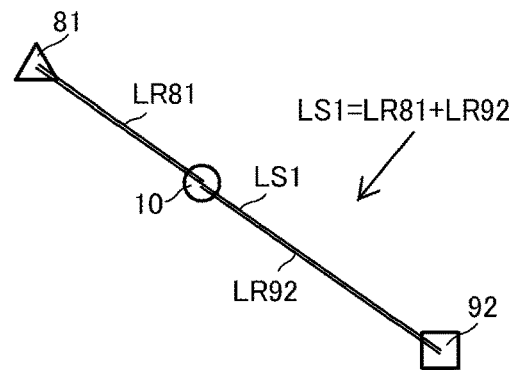
Figure 9A:
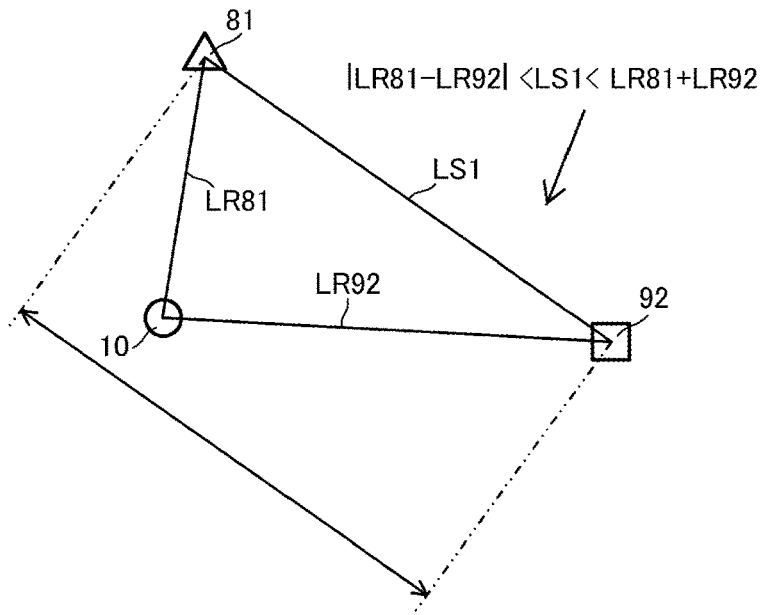
FIGS. 9A, 9B, and 9C are each a view for explaining another idea for calculating the tentative reference-target distance.
Figure 9B:
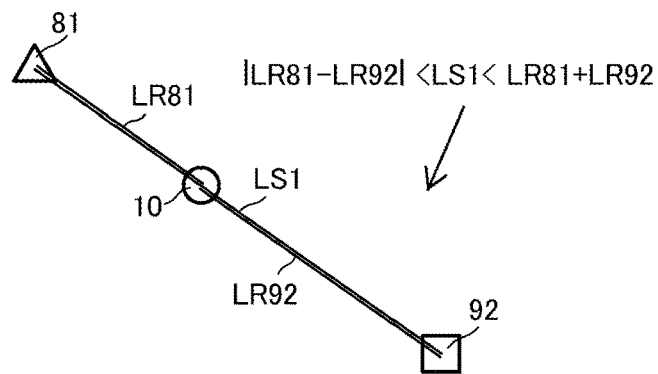

If the target location inference apparatus 10, the target, and the reference object are arranged on a line, the straight line connecting the target and the reference object, the straight line connecting the target and the target location inference apparatus 10, and the straight line connecting the reference object and the target location inference apparatus 10 are parallel, and one of the straight lines matches a straight line connecting the other two straight lines (see FIGS. 4B and 9B).

The target location inference apparatus 10 calculates a distance between the target and the reference object (reference-target distance) by using such a geometric relationship among the target, the reference object, and the target location inference apparatus 10, the first transmitter-receiver distance (distance between the target and the target location inference apparatus 10), and the second transmitter-receiver distance (distance between the reference object and the target location inference apparatus 10). The target location inference apparatus 10 infers a rough range in which the target is present with respect to the reference object by using the reference-target distance.

Figure 7:
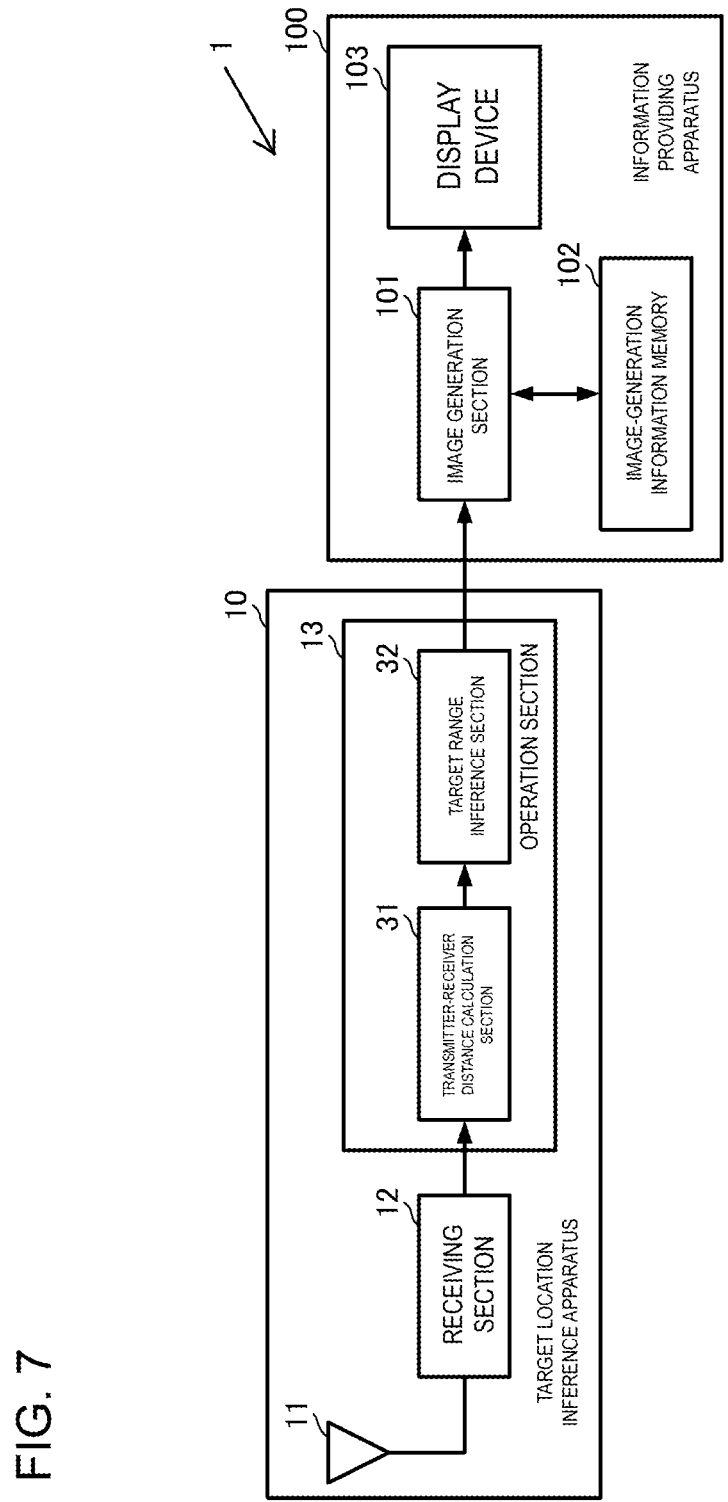
FIG. 7 is a functional block diagram illustrating an example configuration of a target information providing apparatus according to the first embodiment.

The target location inference apparatus 10 outputs the inferred information to an information providing apparatus 100 (see FIGS. 1 and 7). The information providing apparatus 100 forms and displays an image of the inferred information (see FIGS. 8A, 8B, and 8C).

The worker WO looks at the display and thereby can recognize the range in which the target is located with respect to the reference object. The worker WO can thereby infer the location of the target.

Configuration and Process by Target Location Inference Apparatus 10

Figure 2:
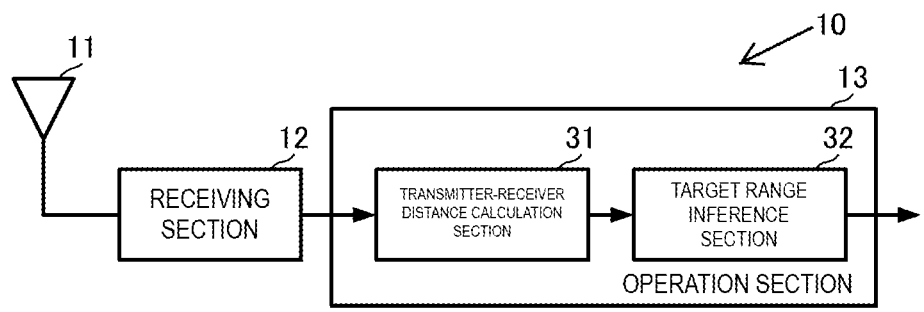
FIG. 2 is a functional block diagram illustrating an example configuration of a target location inference apparatus according to a first embodiment.
Figure 3:
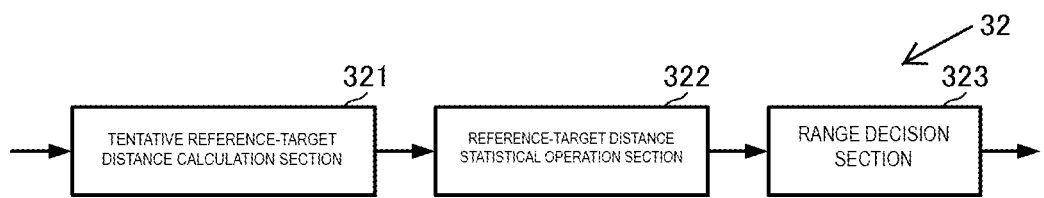
FIG. 3 is a functional block diagram illustrating an example configuration of a target range inference section of the target location inference apparatus.

FIG. 2 is a functional block diagram illustrating an example configuration of a target location inference apparatus according to a first embodiment. FIG. 3 is a functional block diagram illustrating an example configuration of a target range inference section of the target location inference apparatus.

As illustrated in FIG. 2, the target location inference apparatus 10 includes an antenna 11, a receiving section 12 (e.g., a receiver and/or a processor), and an operation section 13 (e.g., a processor).

The antenna 11 receives the first signals from the tags 81 to 84 and the second signals from the tags 91 to 94 and outputs the first and second signals to the receiving section 12. The receiving section 12 demodulates the identification information superimposed on the first and second signals. At this time, the receiving section 12 measures the respective RSSIs of the first and second signals. The receiving section 12 pairs each RSSI with the corresponding identification information and outputs the pair to the operation section 13. The receiving section 12 continuously demodulates the first and second signals and measures the RSSI of each signal in a predetermined receiving period. The receiving section 12 then pairs the RSSI with the corresponding identification information and outputs the pair. The predetermined receiving period is, for example, a period of an operation for waiting for receiving for 200 ms and then being idle for 800 ms.

The operation section 13 includes a transmitter-receiver distance calculation section 31 and a target range inference section 32. The RSSI and the identification information are input to the transmitter-receiver distance calculation section 31. Based on the identification information, the transmitter-receiver distance calculation section 31 calculates, from the RSSI, a transmitter-receiver distance between the target location inference apparatus 10 and each of the tags 81 to 84 and 91 to 94.

More specifically, the transmitter-receiver distance calculation section 31 calculates a first transmitter-receiver distance between the target location inference apparatus 10 and each of the tags 81 to 84 from which the identification information is successfully acquired, from the RSSI of each of the tags 81 to 84 from which the identification information is successfully acquired. The transmitter-receiver distance calculation section 31 calculates a second transmitter-receiver distance between the target location inference apparatus 10 and each of the tags 91 to 94 from which the identification information is successfully acquired, from the RSSI of each of the tags 91 to 94 from which the identification information is successfully acquired.

The transmitter-receiver distance calculation section 31 outputs the first transmitter-receiver distance and the second transmitter-receiver distance thus calculated and the corresponding identification information to the target range inference section 32. The transmitter-receiver distance calculation section 31 continuously calculates and outputs the first transmitter-receiver distance and the second transmitter-receiver distance, for example, every time the RSSI is input. Note that the transmitter-receiver distance calculation section 31 may calculate and output the first transmitter-receiver distance and the second transmitter-receiver distance every predetermined number of times the RSSI is input.

As illustrated in FIG. 3, the target range inference section 32 includes a tentative reference-target distance calculation section 321, a reference-target distance statistical operation section 322, and a range decision section 323.

The tentative reference-target distance calculation section 321 calculates a tentative reference-target distance by using the first transmitter-receiver distance and the second transmitter-receiver distance. For example, the tentative reference-target distance calculation section 321 calculates a tentative distance between the tag 81 and the tag 92 by using the first transmitter-receiver distance between the tag 81 and the target location inference apparatus 10 and the second transmitter-receiver distance between the tag 92 and the target location inference apparatus 10, in other words, calculates a tentative distance (tentative reference-target distance) between the target 801 and the reference object 902.

Figure 4C:
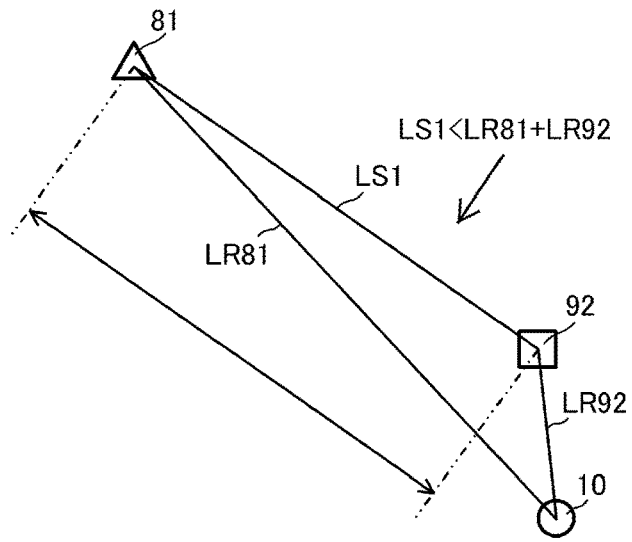

FIGS. 4A, 4B, and 4C are each a view for explaining an idea for calculating the tentative reference-target distance. FIGS. 4A and 4C illustrate a case where a target location inference apparatus is present in a location different from a location on a straight line connecting the tag of a target (first transmitter) and the tag of a reference object (second transmitter). FIG. 4B illustrates a case where the target location inference apparatus is present on the straight line connecting the tag of the target (first transmitter) and the tag of the reference object (second transmitter). FIG. 4A illustrates a case where the target location inference apparatus is present between the tag of the target (first transmitter) and the tag of the reference object (second transmitter) along the line connecting the tag of the target (first transmitter) and the tag of the reference object (second transmitter). FIG. 4C illustrates a case where the target location inference apparatus is not present between the tag of the target (first transmitter) and the tag of the reference object (second transmitter) along the line connecting the tag of the target (first transmitter) and the tag of the reference object (second transmitter).

In FIGS. 4A, 4B, and 4C, a first transmitter-receiver distance LR81 between the tag 81 and the target location inference apparatus 10 is calculated from a received radio signal strength indicator $RSSI_{81}$ of a first signal $SB_{81}$ from the tag 81, and a second transmitter-receiver distance LR92 between the tag 92 and the target location inference apparatus 10 is calculated from a received radio signal strength indicator $RSSI_{92}$ of a second signal $SB_{92}$ from the tag 92.

If the target location inference apparatus 10 is not present on the straight line connecting the tag 81 and the tag 92 as illustrated in FIGS. 4A and 4C, a geometric distance LS1 between the tag 81 and the tag 92 is shorter than a distance obtained by adding up the first transmitter-receiver distance LR81 and the second transmitter-receiver distance LR92. That is, a relation LS1<LR81+LR92 is satisfied.

As illustrated in FIG. 4B, if the target location inference apparatus 10 is present on the straight line connecting the tag 81 and the tag 92 and between the tag 81 and the tag 92, the geometric distance LS1 between the tag 81 and the tag 92 is equal to the distance obtained by adding up the first transmitter-receiver distance LR81 and the second transmitter-receiver distance LR92. That is, a relation LS1=LR81+LR92 is satisfied.

Suppose a case where the target location inference apparatus 10 is present on the straight line connecting the tag 81 and the tag 92 and is not present between the tag 81 and the tag 92; however, this is not illustrated in FIGS. 4A to 4C. In this case, the geometric distance LS1 between the tag 81 and the tag 92 is shorter than the distance obtained by adding up the first transmitter-receiver distance LR81 and the second transmitter-receiver distance LR92.

By using the relation, the tentative reference-target distance calculation section 321 calculates, as the tentative reference-target distance, an addition-result distance Ladd obtained by adding up a first transmitter-receiver distance and a second transmitter-receiver distance. The tentative reference-target distance is thus longer than or equal to a geometric distance between a target (in more detailed explanation, the tag of the target) and a reference object (in more detailed explanation, the tag of the reference object). For example, in a relationship between the tag 81 and the tag 92, the tentative reference-target distance between the tag 81 and the tag 92 is an addition-result distance Ladd (LR81+LR92) between the first transmitter-receiver distance LR81 and the second transmitter-receiver distance LR92, and the addition-result distance Ladd (LR81+LR92) is longer than or equal to the geometric distance LS1.

Further, the shorter the first transmitter-receiver distance and the second transmitter-receiver distance thus calculated, the higher the RSSIs thereof. If a system that amplifies and relays signals is not provided between the target location inference apparatus and tags, the RSSIs are not unwantedly high. Accordingly, the unwantedly short first transmitter-receiver distance and second transmitter-receiver distance are not calculated.

In contrast, an RSSI is attenuated due to a multipath or the like to a higher degree than a degree of direct attenuation in distance between a tag and the target location inference apparatus on occasions. In this case, long first transmitter-receiver distance and second transmitter-receiver distance are calculated. The above-described relation between the geometric distance and the addition-result distance obtained by adding up the first transmitter-receiver distance and the second transmitter-receiver distance is thus satisfied.

The tentative reference-target distance calculation section 321 continuously calculates the tentative reference-target distance at predetermined time intervals (for example, when the first transmitter-receiver distance and the second transmitter-receiver distance are acquired at substantially the same time). In this case, the first transmitter-receiver distance and the second transmitter-receiver distance are desirably acquired at the same time, but distances in a predetermined time range may be paired, depending on the moving speed of the worker WO and a calculation error of the tentative reference-target distance.

The tentative reference-target distance calculation section 321 outputs the calculated tentative reference-target distance to the reference-target distance statistical operation section 322. At this time, the tentative reference-target distance calculation section 321 serially or collectively outputs tentative reference-target distances serially calculated at a plurality of times to the reference-target distance statistical operation section 322.

The reference-target distance statistical operation section 322 performs a predetermined statistical operation on the tentative reference-target distances calculated at the respective times and calculates a reference-target distance.

Figure 5A:
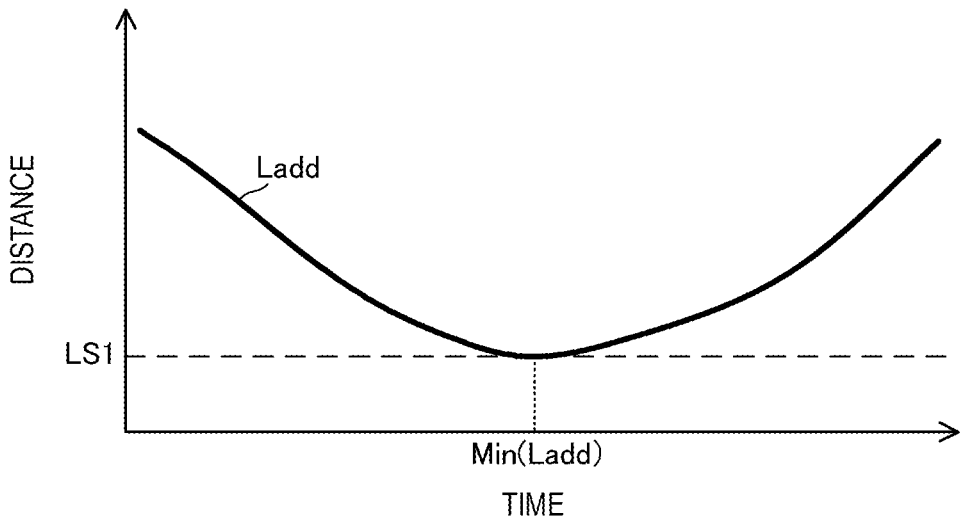
FIGS. 5A and 5B are each a graph illustrating changes of an addition-result distance with the movement of the target location inference apparatus.
Figure 5B:
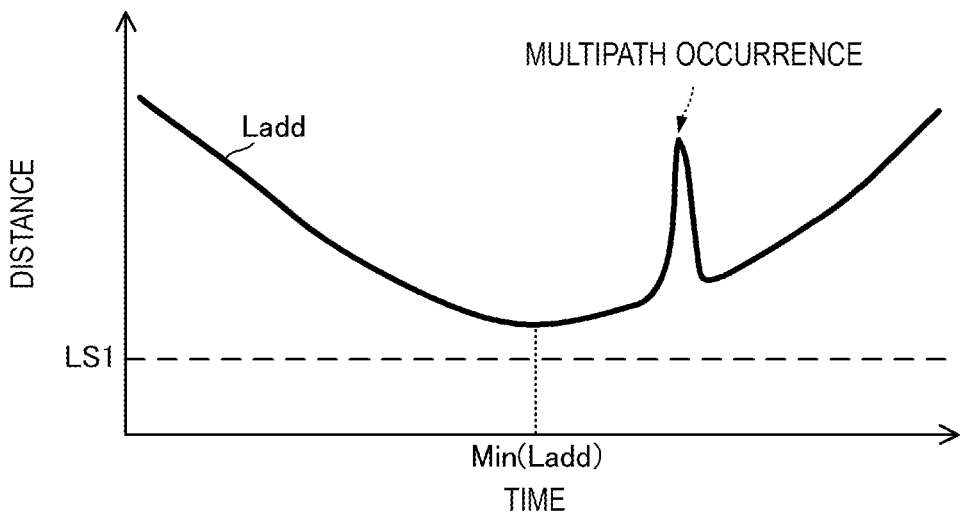

FIGS. 5A and 5B are each a graph illustrating changes of an addition-result distance with the movement of the target location inference apparatus. FIG. 5A illustrates a case where the target location inference apparatus is temporarily present on the line connecting the target and the reference object. FIG. 5B illustrates a case where the target location inference apparatus is not present on the line connecting the target and the reference object and where multipath occurrence is included. Note that FIGS. 5A and 5B illustrate the cases of FIGS. 4A, 4B, and FIG. 4C described above.

When the target location inference apparatus 10 approaches the line connecting the target 801 (tag 81) and the reference object 902 (tag 92), the tentative reference-target distance (addition-result distance Ladd) is decreased in such a manner as to approach the geometric distance LS1, as illustrated in FIGS. 5A and 5B. When the target location inference apparatus 10 is on the line connecting the target 801 (tag 81) and the reference object 902 (tag 92), the tentative reference-target distance (addition-result distance Ladd) is equal to the geometric distance LS1. In contrast, when the target location inference apparatus 10 moves away from the line connecting the target 801 (tag 81) and the reference object 902 (tag 92), the tentative reference-target distance (addition-result distance Ladd) is increased in such a manner as to move away from the geometric distance LS1. Further, when a multipath occurs, the tentative reference-target distance (addition-result distance Ladd) is locally increased, as illustrated in FIG. 5B.

The reference-target distance statistical operation section 322 calculates a minimum value Min (Ladd) of the tentative reference-target distance (addition-result distance Ladd) as a statistical operation value. The above-described changes of the tentative reference-target distance (addition-result distance Ladd) lead to the minimum value Min (Ladd) equal to or closest to the geometric distance LS1.

The reference-target distance statistical operation section 322 can thus infer a value closest to a distance between a target and a reference object or a distance, between the target and the reference object, obtained by measuring the RSSIs.

The reference-target distance statistical operation section 322 outputs the statistical operation value to the range decision section 323.

The range decision section 323 decides a target presence range with respect to the reference object by using the statistical operation value and the identification information of the target and the reference object used for the statistical operation value. More specifically, the range decision section 323 decides, as the target presence range, a circle centered at the reference object and having a radius of the statistical operation value.

In this case, as described above, the statistical operation value is equal to a distance between the target and the reference object, or the statistical operation value is substantially equal to and longer than the distance between the target and the reference object. The target location inference apparatus 10 can thus infer the target presence range more reliably and output the information regarding the target presence range.

Further, in the configuration and the process, the target is present within the range decided by the range decision section 323 and near the circumference of the range. The target location inference apparatus 10 can thereby infer the target presence range of a substantially minimum size.

Target Location Inference Method

Figure 6:
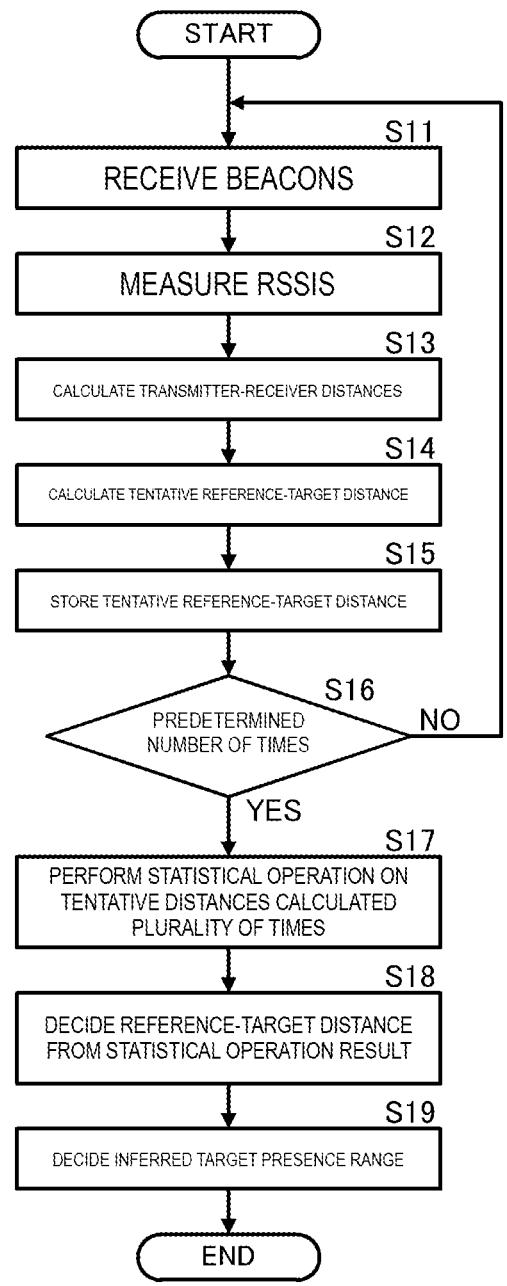
FIG. 6 is a flowchart illustrating a target location inference method according to the first embodiment.

FIG. 6 is a flowchart illustrating a target location inference method according to the first embodiment. The details of steps in the flowchart have been described for the configuration above of the target location inference apparatus 10, and thus detailed description of some parts is hereinafter omitted.

The target location inference apparatus 10 receives respective signals (a first signal and a second signal), such as beacons from the tag of a target and the tag of a reference object (S11). The target location inference apparatus 10 measures the first received radio signal strength of the first signal and the second received radio signal strength of the second signal (S12).

The target location inference apparatus 10 calculates a first transmitter-receiver distance from the first received radio signal strength and a second transmitter-receiver distance from the second received radio signal strength (S13). The target location inference apparatus 10 calculates a tentative reference-target distance by using the first transmitter-receiver distance and the second transmitter-receiver distance (S14) and stores the tentative reference-target distance (S15).

The target location inference apparatus 10 repeats the above-described steps until the number of times the steps are performed reaches the number of times allowing a statistical operation value to be calculated (the predetermined number of times) (S16: NO).

If the number of times reaches the predetermined number of times (S16: YES), the target location inference apparatus 10 performs the statistical operation on the tentative reference-target distances calculated at a plurality of times (S17). The statistical operation is, for example, the minimum value extraction process.

The target location inference apparatus 10 decides a reference-target distance from the result of the statistical operation (S18). The target location inference apparatus 10 decides a target presence range (inferred presence range) from the reference-target distance (S19). Note that the decision of the target presence range may be omitted. In this case, the target location inference apparatus 10 outputs the reference-target distance.

Configuration and Process by a Target Information Providing Apparatus.

FIG. 7 is a functional block diagram illustrating an example configuration of a target information providing apparatus according to the first embodiment. As illustrated in FIG. 7, a target information providing apparatus 1 (e.g., a processor and/or a display) includes the target location inference apparatus 10 and the information providing apparatus 100.

The target location inference apparatus 10 has the configuration above, and thus explanation of the specific configuration of the target location inference apparatus 10 is omitted. The target location inference apparatus 10 is also capable of performing data communication with the information providing apparatus 100.

The information providing apparatus 100 includes an image generation section 101, an image-generation information memory 102, and a display device 103. The image generation section 101 receives, from the target location inference apparatus 10, the identification information of a target, the identification information of a reference object, and a reference-target distance.

The image-generation information memory 102 stores, for example, as text data, particular information based on the identification information, such as the type or the name of the target and the type or the name of the reference object. The image-generation information memory 102 may also store image data regarding the target and the reference object based on the identification information.

The image generation section 101 reads out the type or the name of the target from the image-generation information memory 102 by using the identification information acquired from the target location inference apparatus 10. The image generation section 101 generates an image for providing information by using the data read out from the image-generation information memory 102 and the reference-target distance.

Figure 8A:
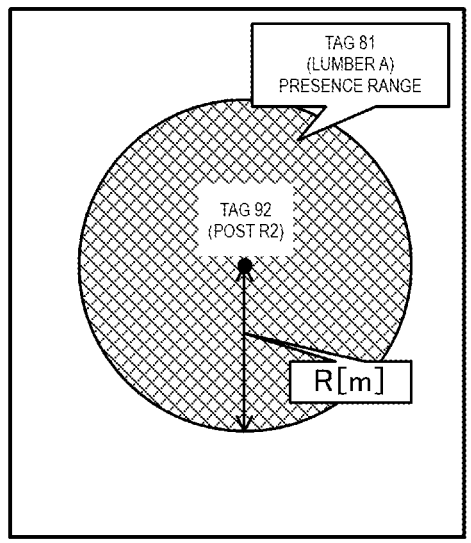
FIGS. 8A, 8B, and 8C are each a view illustrating an example of an image for providing information.
Figure 8B:
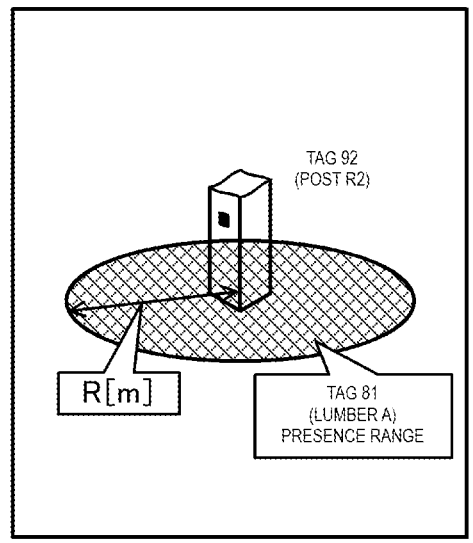
Figure 8C:
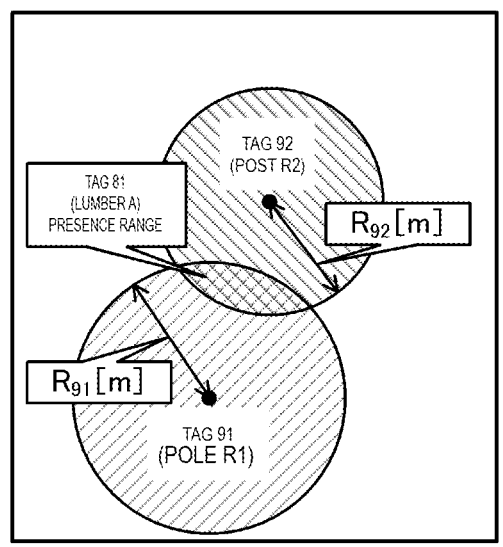

FIGS. 8A, 8B, and 8C are each a view illustrating an example of an image for providing information.

In the example in FIG. 8A, the image generation section 101 generates an image representing a target presence range in a plan view. In the image, the target presence range with respect to the reference object is represented by using a circle centered at the reference object. In this case, the radius of the circle is set by using the reference-target distance. In addition, information identifying the reference object (in the example in FIG. 8A, the tag 92 (a post R2 (reference object 902))) is presented in the center of the circle.

In the example in FIG. 8B, the image generation section 101 generates an image representing a target presence range in a perspective view. In the image, the target presence range with respect to the reference object is represented by using a circle centered at the reference object. In this case, the radius of the circle is set by using the reference-target distance. In addition, information identifying the reference object (in the example in FIG. 8B, the tag 92 (the post R2 (reference object 902))) and an image representing the shape of the reference object are presented in the center of the circle.

In the example in FIG. 8C, the image generation section 101 generates an image representing a target presence range in a plan view. In this case, the image generation section 101 uses distances between the target and two reference objects (reference-target distances). In the image, the target presence range is represented by using a circle centered at a first reference object and a circle centered at a second reference object. In this case, the radius of each circle is set by using the corresponding reference-target distance with respect to the reference object. In addition, pieces of information identifying the reference objects (in the example in FIG. 8C, the tag 92 (post R2 (reference object 902)) and the tag 91 (a pole R1 (reference object 901))) are each presented in the center of the corresponding circle. In this configuration, an area where the two circles overlap can be determined as a highly possible target presence range.

The image generation section 101 outputs the generated image for providing information to the display device 103. The display device 103 displays the image.

The use of the configuration as described above enables a worker to easily see and know a target presence range with respect to a reference object and the reference object serving as a point of reference for the target presence range.

Second Embodiment

For the configuration and the process above, an aspect in which the minimum value Min (Ladd) of the addition-result distance obtained by adding up the first transmitter-receiver distance and the second transmitter-receiver distance is used as the statistical operation value has been described. However, the statistical operation value may be calculated in the following idea.

Figure 9C:
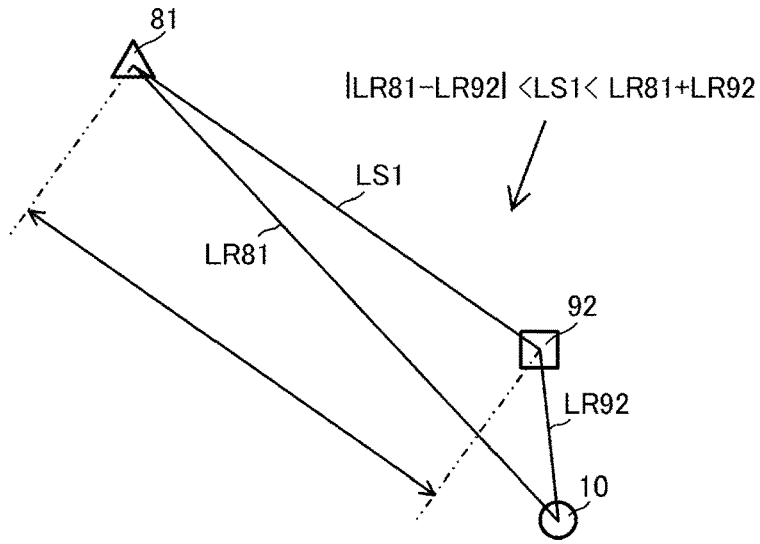

FIGS. 9A, 9B, and 9C are each a view for explaining another idea for calculating the tentative reference-target distance. FIGS. 9A and 9C illustrate the case where a target location inference apparatus is present in a location different from the location on the straight line connecting the tag of a target (first transmitter) and the tag of a reference object (second transmitter). FIG. 9B illustrates the case where the target location inference apparatus is present on the straight line connecting the tag of the target (first transmitter) and the tag of the reference object (second transmitter). FIG. 9A illustrates the case where the target location inference apparatus is present between the tag of the target (first transmitter) and the tag of the reference object (second transmitter) along the line connecting the tag of the target (first transmitter) and the tag of the reference object (second transmitter). FIG. 9C illustrates the case where the target location inference apparatus is not present between the tag of the target (first transmitter) and the tag of the reference object (second transmitter) along the line connecting the tag of the target (first transmitter) and the tag of the reference object (second transmitter).

In FIGS. 9A, 9B, and 9C, the first transmitter-receiver distance LR81 between the tag 81 and the target location inference apparatus 10 is calculated from the received radio signal strength indicator $RSSI_{81}$ of the first signal $SB_{81}$ from the tag 81. The second transmitter-receiver distance LR92 between the tag 92 and the target location inference apparatus 10 is calculated from the received radio signal strength indicator $RSSI_{92}$ of the second signal $SB_{92}$ from the tag 92.

If the target location inference apparatus 10 is not present on the straight line connecting the tag 81 and the tag 92 as illustrated in FIGS. 9A and 9C, the geometric distance LS1 between the tag 81 and the tag 92 is shorter than the distance obtained by adding up the first transmitter-receiver distance LR81 and the second transmitter-receiver distance LR92, and the value thereof is larger than the absolute value of a value obtained by subtracting the second transmitter-receiver distance LR92 from the first transmitter-receiver distance LR81. That is, a relation |LR81−LR92|<LS1<LR81+LR92 is satisfied.

The median between the subtraction absolute value |LR81−LR92| and the addition value LR81+LR92 is a larger one of the values of the first transmitter-receiver distance LR81 and the second transmitter-receiver distance LR92 than the other, that is, the maximum value between the first transmitter-receiver distance LR81 and the second transmitter-receiver distance LR92.

Figure 10A:
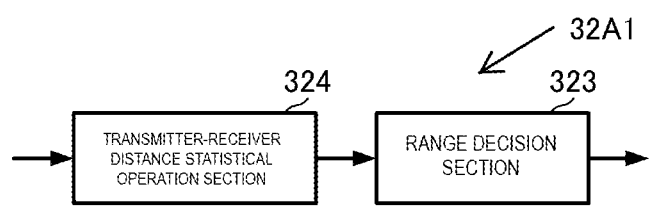
FIGS. 10A and 10B are each a functional block diagram illustrating an example configuration of a target range inference section of a target location inference apparatus according to a second embodiment.
Figure 10B:
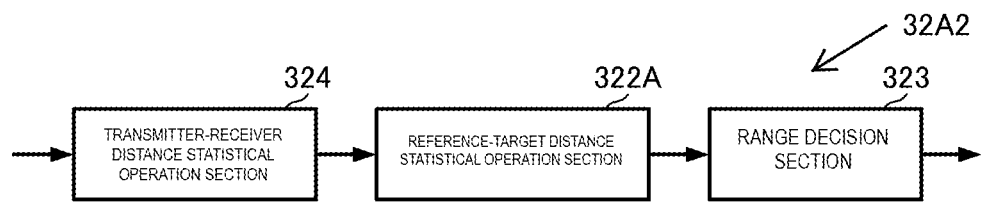

This is utilized, and the maximum value between the first transmitter-receiver distance LR81 and the second transmitter-receiver distance LR92 is used as the statistical operation value. FIGS. 10A and 10B are each a functional block diagram illustrating an example configuration of a target range inference section of a target location inference apparatus according to a second embodiment.

As illustrated in FIG. 10A, a target range inference section 32A1 includes a transmitter-receiver distance statistical operation section 324 and the range decision section 323. The configuration except the transmitter-receiver distance statistical operation section 324 is the same as the configuration of the target location inference apparatus 10 according to the first embodiment, and the description of the same parts is omitted.

The transmitter-receiver distance statistical operation section 324 compares a first transmitter-receiver distance with a second transmitter-receiver distance and outputs the maximum value as the reference-target distance.

The use of the configuration also enables the target location inference apparatus to infer a highly possible presence range, that is, a target presence range more reliably.

As illustrated in FIG. 10B, a target range inference section 32A2 includes the transmitter-receiver distance statistical operation section 324, a reference-target distance statistical operation section 322A, and the range decision section 323.

The reference-target distance statistical operation section 322A stores the reference-target distance output from the transmitter-receiver distance statistical operation section 324 (the maximum value between the first transmitter-receiver distance and the second transmitter-receiver distance) the predetermined number of times. The reference-target distance statistical operation section 322A sets the maximum value among the reference-target distances as the reference-target distance again and outputs the reference-target distance to the range decision section 323. This further improves the inference accuracy of the target presence range. Note that the reference-target distance statistical operation section 322A may use a mean value of the reference-target distances calculated at a plurality of times.

Note that the statistical operation value is not limited to the minimum value Min (Ladd) of the addition-result distance obtained by adding up the first transmitter-receiver distance and the second transmitter-receiver distance or the maximum value between the first transmitter-receiver distance and the second transmitter-receiver distance in the embodiments as described above. As long as a value enables the geometric distance LS1 or a value close to the geometric distance LS1 to be inferred from the tentative reference-target distance (addition-result distance Ladd), the value may be used.

Third Embodiment

Configuration and Process by Target Location Inference Apparatus

Figure 11:
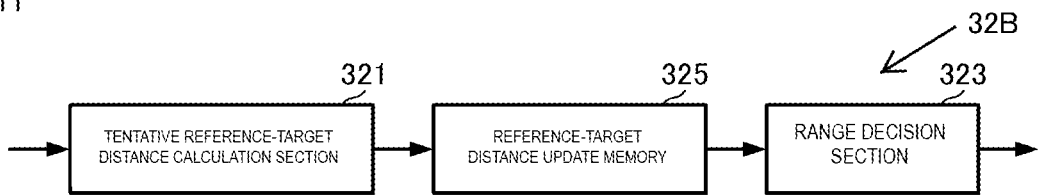
FIG. 11 is a functional block diagram illustrating an example configuration of a target range inference section of a target location inference apparatus according to a third embodiment.

FIG. 11 is a functional block diagram illustrating an example configuration of a target range inference section of a target location inference apparatus according to a third embodiment. The target location inference apparatus according to the third embodiment differs from the target location inference apparatus 10 according to the first embodiment in the configuration and the process by a target range inference section 32B. The configuration and the process by the other components of the target location inference apparatus according to the third embodiment are the same as those of the target location inference apparatus 10 according to the first embodiment, and the description of the same parts is omitted.

The target range inference section 32B includes the tentative reference-target distance calculation section 321, a reference-target distance update memory 325, and the range decision section 323. The tentative reference-target distance calculation section 321 and the range decision section 323 are the same as those of the target location inference apparatus 10 according to the first embodiment, and description thereof is omitted.

The reference-target distance update memory 325 updates and stores the statistical operation value of tentative reference-target distances. More specifically, suppose a case where the minimum value of the tentative reference-target distance is used as the reference-target distance. If the value of a newly input tentative reference-target distance is smaller than the value of the reference-target distance obtained in the previous arithmetic operations, in other words, the minimum value of the tentative reference-target distance to date, the reference-target distance update memory 325 updates and stores the newly input tentative reference-target distance as a new reference-target distance. In contrast, if the newly input tentative reference-target distance is longer than or equal to the reference-target distance obtained in the previous arithmetic operations, the reference-target distance update memory 325 keeps and stores the reference-target distance at that time point. The reference-target distance update memory 325 outputs, to the range decision section 323, the reference-target distance having experienced the update and the storing that are performed the predetermined number of times.

This update and storing process is applicable to the above-described case where the maximum value between the first transmitter-receiver distance and the second transmitter-receiver distance is used.

With the configuration as described above, the target location inference apparatus according to the third embodiment can infer the target presence range more reliably.

Target Location Inference Method

Figure 12:
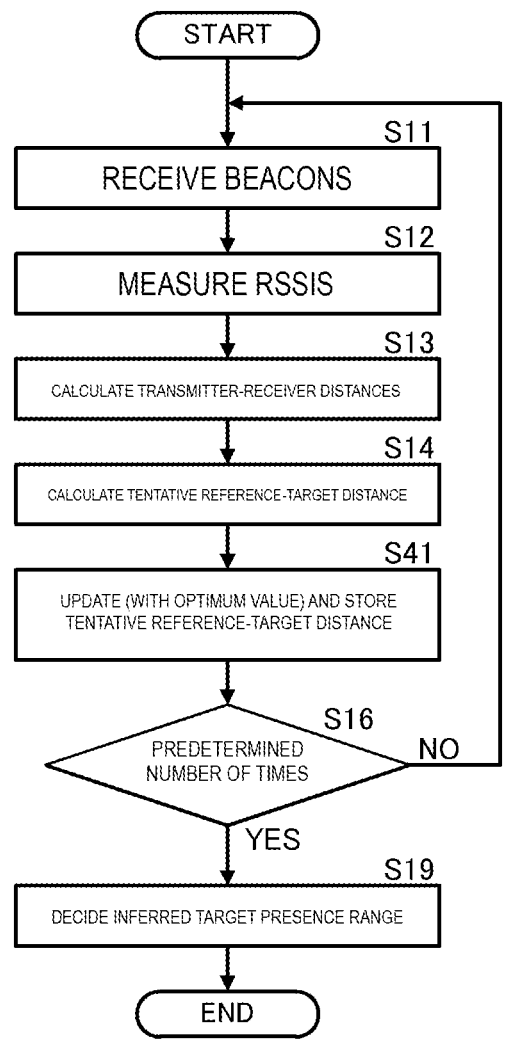
FIG. 12 is a flowchart illustrating a target location inference method according to the third embodiment.

FIG. 12 is a flowchart illustrating a target location inference method according to the third embodiment. The details of steps in the flowchart have been described for the configuration above of the target location inference apparatus, and thus detailed description of some parts is hereinafter omitted.

The target location inference apparatus receives respective signals (a first signal and a second signal), such as beacons from the tag of a target and the tag of a reference object (S11). The target location inference apparatus measures the first received radio signal strength of the first signal and the second received radio signal strength of the second signal (S12).

The target location inference apparatus calculates a first transmitter-receiver distance from the first received radio signal strength and a second transmitter-receiver distance from the second received radio signal strength (S13). The target location inference apparatus calculates a tentative reference-target distance by using the first transmitter-receiver distance and the second transmitter-receiver distance (S14).

The target location inference apparatus compares the calculated tentative reference-target distance with the stored reference-target distance (the minimum value of the tentative reference-target distance in the past). If the calculated tentative reference-target distance is shorter than the reference-target distance, the target location inference apparatus updates and stores the calculated tentative reference-target distance as a new reference-target distance (S41).

The target location inference apparatus repeats these steps until the predetermined number of times (S16: NO).

If the number of times reaches the predetermined number of times (S16: YES), the target location inference apparatus outputs the reference-target distance at that time point and decides a target presence range (inferred presence range) from the reference-target distance (S19).

The case where the target location inference apparatus moves has been described for the configuration and the process by the embodiments above. However, if the target location inference apparatus does not move, that is, if the worker searches for the target at rest, the statistical operation value of the first transmitter-receiver distance and the second transmitter-receiver distance may be used. For example, a value obtained by adding up the minimum value of the first transmitter-receiver distance and the minimum value of the second transmitter-receiver distance may be used as the reference-target distance.

Fourth Embodiment

Configuration and Process by Target Location Inference System

An aspect in which the target location inference apparatus is used alone has been described in each embodiment above. However, a target location inference system of a fourth embodiment decides a target presence range by using inferred information regarding target inference apparatuses (target information providing apparatuses).

Figure 13:
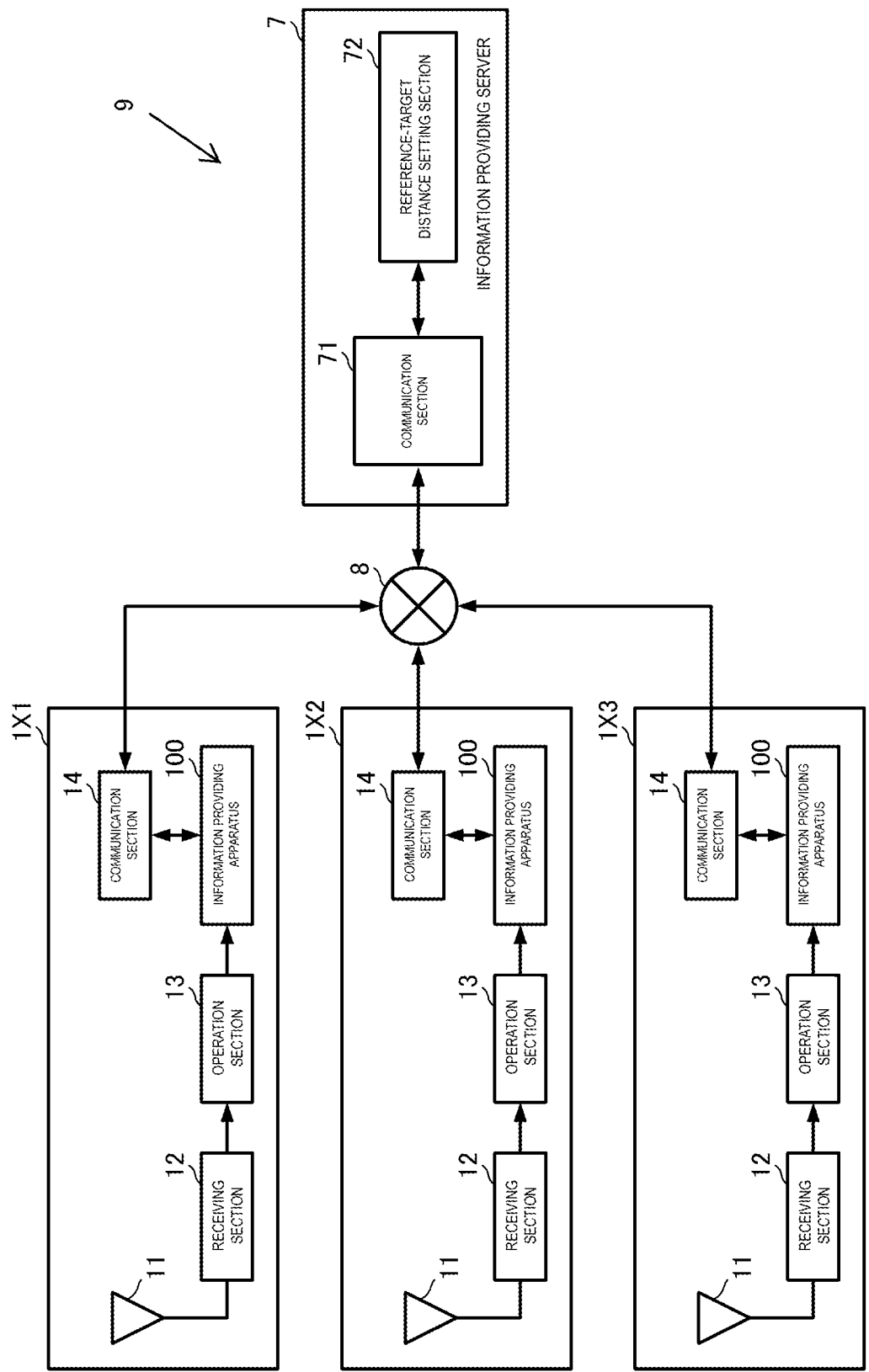
FIG. 13 is a functional block diagram illustrating an example configuration of a target location inference system according to a fourth embodiment.

FIG. 13 is a functional block diagram illustrating an example configuration of the target location inference system according to the fourth embodiment. As illustrated in FIG. 13, a target location inference system 9 includes target information providing apparatuses (target information providing apparatuses 1X1, 1X2, and 1X3), and an information providing server 7.

The target information providing apparatuses 1X1, 1X2, and 1X3 are connected to the information providing server 7 with a data communication network 8 interposed therebetween, such as the Internet.

The target information providing apparatuses 1X1, 1X2, and 1X3 each include the antenna 11, the receiving section 12, the operation section 13, the information providing apparatus 100, and a communication section 14. The communication section 14 controls communications with a communication section 71 of the information providing server 7.

Each of the target information providing apparatuses 1X1, 1X2, and 1X3 transmits a reference-target distance inferred by the calculation to the information providing server 7. At this time, each of the target information providing apparatuses 1X1, 1X2, and 1X3 transmits, in association with the reference-target distance, the identification information of the respective tags of a target and a reference object that are used for the inference calculation of the reference-target distance.

The information providing server 7 includes the communication section 71 and a reference-target distance setting section 72. The communication section 71 controls communications with the communication sections 14 of the respective target information providing apparatuses 1X1, 1X2, and 1X3.

The reference-target distance setting section 72 stores the reference-target distance transmitted from the target information providing apparatuses 1X1, 1X2, and 1X3.

FIG. 14 is a table illustrating an example of the information stored in the information providing server 7. As illustrated in FIG. 14, the reference-target distance setting section 72 stores a reference-target distance for each pair of the tag of a target and the tag of a reference object. For example, the reference-target distance setting section 72 stores a reference-target distance $L_{9181}$ for the pair of the tag 81 of the target 801 and the tag 91 of the reference object 901. In this case, the reference-target distance setting section 72 may discriminate the apparatus from which the stored reference-target distance is acquired (see (X1) in FIG. 14).

After acquiring a new reference-target distance from the communication section 71, the reference-target distance setting section 72 compares the acquired reference-target distance with the stored reference-target distance. The reference-target distance setting section 72 updates the stored reference-target distance with the minimum value, if necessary.

After the reference-target distance is updated, the reference-target distance setting section 72 outputs the updated reference-target distance to the communication section 71. The communication section 71 transmits the updated reference-target distance to the communication section 14.

Each of the target information providing apparatuses 1X1, 1X2, and 1X3 can thus use a more likely reference-target distance acquired by one of the target information providing apparatuses 1X1, 1X2, and 1X3. Each of the target information providing apparatuses 1X1, 1X2, and 1X3 can also use a reference-target distance not acquired by itself.

The target information providing apparatuses 1X1, 1X2, and 1X3 may transmit acquisition trigger to the information providing server 7 when the updated reference-target distance is intended to be acquired. The information providing server 7 may transmit a most recent reference-target distance to the target information providing apparatus having transmitted the acquisition trigger in response to the acquisition trigger.

In this embodiment, the target information providing apparatuses 1X1, 1X2, and 1X3 each include the operation section 13 and the information providing apparatus 100; however, the information providing server 7 may include these components. Further, the information providing server 7 may include an interface with a user terminal to display an updated reference-target distance. The user terminal is not limited to the target information providing apparatus and a terminal apparatus including the target information providing apparatus. The user terminal may be any apparatus capable of communicating with the information providing server 7 and having a displaying function and a reporting function.

In this embodiment, the target location inference system 9 includes the target information providing apparatuses and the information providing server. However, the target location inference system 9 may include the target location inference apparatus.

The configurations of the respective embodiments above may be appropriately combined and can exert operations and effects according the combination.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A target location inference apparatus comprising:
a receiver configured to receive a first radio signal from a first transmitter disposed on a target and a second radio signal from a second transmitter disposed in a reference location; and
at least one processor configured to:
measure a received signal strength of the first and second radio signals, and
infer a target presence range with respect to the reference location, the target presence range being a range in which the target is present, and the target presence range being inferred based on the received signal strengths of the first radio signal and of the second radio signal.

2. The target location inference apparatus according to claim 1, wherein the at least one processor is configured to:
determine a first transmitter-receiver distance between the first transmitter and the receiver from the first received radio signal strength;
determine a second transmitter-receiver distance between the second transmitter and the receiver from the second received radio signal strength; and
infer the target presence range with respect to the reference location based on the first transmitter-receiver distance and the second transmitter-receiver distance.

3. The target location inference apparatus according to claim 2, wherein the at least one processor is further configured to use a statistical operation value obtained from the first transmitter-receiver distance and the second transmitter-receiver distance to infer the target presence range, the target presence range including the reference location and the target.

4. The target location inference apparatus according to claim 3, wherein the at least one processor is configured to:
determine the first transmitter-receiver distance and the second transmitter-receiver distance a predetermined number of times,
determine a tentative distance between the reference location and a location of the target for each pair of first and second transmitter-receiver distances determined until the predetermined number of times, and
infer the target presence range with respect to the reference location by using, as the statistical operation value, a minimum value of the tentative distance calculated each time until the predetermined number of times.

5. The target location inference apparatus according to claim 3, wherein the at least one processor is configured to infer the target presence range with respect to the reference location using, as the statistical operation value, a maximum value between the first transmitter-receiver distance and the second transmitter-receiver distance.

6. The target location inference apparatus according to claim 3, wherein the at least one processor is configured to:
determine the first transmitter-receiver distance and the second transmitter-receiver distance a predetermined number of times,
determine a maximum value between the first transmitter-receiver distance and the second transmitter-receiver distance as a tentative distance between the reference location and a location of the target each time until the predetermined number of times, and
infer the target presence range with respect to the reference location by using, as the statistical operation value, a minimum value among a plurality of the calculated tentative distances.

7. The target location inference apparatus according to claim 2, wherein the at least one processor is configured to:
determine the first transmitter-receiver distance and the second transmitter-receiver distance a predetermined number of times, and
determine a tentative distance between the reference location and a location of the target for a group of the first transmitter-receiver distances and a group of the second transmitter-receiver distances, the first transmitter-receiver distance and the second transmitter-receiver distances being determined each time until the predetermined number of times,
update and store a minimum value of the tentative distance for each determined tentative distance for each transmitter-receiver distance for each group, and
infer the target presence range with respect to the reference location based on the updated and stored minimum value.

8. A target information providing apparatus comprising:
the target location inference apparatus according to claim 1; and
an information providing apparatus that provides information indicating the target presence range, wherein the information providing apparatus comprises:
at least one processor configured to generate an image based on the inferred target presence range and information related to the reference location, and
a display device configured to display the image.

9. A target location inference system comprising:
a plurality of the target information providing apparatuses according to claim 8; and
an information providing server configured to perform data communication with a plurality of the target location inference apparatuses,
wherein the information providing server is configured to:
acquire calculation data for the target presence range with respect to the reference location from the plurality of target location inference apparatuses,
determine a statistical operation value of the calculation data, and
transmit the statistical operation value to a user terminal.

10. A target location inference method comprising:
receiving a first radio signal from a first transmitter disposed on a target and a second radio signal from a second transmitter disposed in a reference location; and
infer a target presence range in which the target is present with respect to the reference location based on a first received radio signal strength of the first radio signal in the receiving and a second received radio signal strength of the second radio signal in the receiving.

11. The target location inference method according to claim 10, wherein inferring the target presence range comprises:
determining a first transmitter-receiver distance between the first transmitter and a receiver from the first received radio signal strength;
determining a second transmitter-receiver distance between the second transmitter and the receiver from the second received radio signal strength; and
inferring the target presence range with respect to the reference location based on the first transmitter-receiver distance and the second transmitter-receiver distance.

* * * * *